(12) United States Patent
Swaminathan et al.

(10) Patent No.: US 11,334,566 B2
(45) Date of Patent: May 17, 2022

(54) LATENCY OPTIMIZATION FOR ONLINE SERVICE FEED

(71) Applicant: Microsoft Technology Licensing, LLC, Redmond, WA (US)

(72) Inventors: Manish Swaminathan, Santa Clara, CA (US); Manas Haribhai Somaiya, Sunnyvale, CA (US); Vivek Yogesh Tripathi, San Jose, CA (US); Strahinja Markovic, Mountain View, CA (US); Ali Mohamed, San Jose, CA (US); Muhammad Hassan Khan, Union City, CA (US); Xin Hu, San Jose, CA (US); Caitlin Marie O'Connor, San Francisco, CA (US); Zeesha Currimbhoy, Sunnyvale, CA (US); Shunlin Liang, San Jose, CA (US); Prateek Sachdev, Sunnyvale, CA (US); Madhulekha Arunmozhi, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 244 days.

(21) Appl. No.: 16/747,072

(22) Filed: Jan. 20, 2020

(65) Prior Publication Data
US 2021/0224274 A1 Jul. 22, 2021

(51) Int. Cl.
*G06F 16/2453* (2019.01)
*G06F 16/9535* (2019.01)
(Continued)

(52) U.S. Cl.
CPC .. *G06F 16/24532* (2019.01); *G06F 16/24552* (2019.01); *G06F 16/24578* (2019.01);
(Continued)

(58) Field of Classification Search
CPC ........... G06F 16/24552; G06F 16/9538; G06F 16/24532; G06F 16/2477; G06F 16/9535; G06F 16/24578
See application file for complete search history.

(56) References Cited

U.S. PATENT DOCUMENTS

2009/0210403 A1* 8/2009 Reinshmidt ........... G06F 16/907
2013/0018955 A1* 1/2013 Thaxton ................ G06F 16/958
709/204

(Continued)

*Primary Examiner* — Etienne P Leroux
(74) *Attorney, Agent, or Firm* — Schwegman Lundberg & Woessner, P.A.

(57) ABSTRACT

Methods, systems, and computer programs are presented for reducing latency for providing a user feed containing one or more posts. One method includes operations for receiving a request to access the user feed and for performing a first query to search posts. The first query uses a first time horizon delimiting a creation time of posts and a first maximum number of posts selected for ranking. The posts from the first query are sent to the client device for presentation on a user interface. Further, a second query is performed to search posts, where the second query uses a second time horizon that is greater than the first time horizon and a second maximum number of posts for ranking that is greater than the first maximum number of posts. The posts from the first query and the second query are merged and sent to the client device for presentation.

14 Claims, 13 Drawing Sheets

(51) Int. Cl.
*G06F 16/9538* (2019.01)
*G06F 16/2455* (2019.01)
*G06N 20/00* (2019.01)
*G06N 7/00* (2006.01)
*G06F 16/2457* (2019.01)

(52) U.S. Cl.
CPC ...... *G06F 16/9535* (2019.01); *G06F 16/9538* (2019.01); *G06N 7/005* (2013.01); *G06N 20/00* (2019.01)

(56) References Cited

U.S. PATENT DOCUMENTS

| | | | |
|---|---|---|---|
| 2014/0304623 A1* | 10/2014 | Halliday | H04L 67/22 |
| | | | 715/753 |
| 2016/0357759 A1* | 12/2016 | Kumthekar | G06F 16/73 |
| 2017/0228384 A1* | 8/2017 | Caruso | G06F 16/137 |
| 2018/0113903 A1* | 4/2018 | Rana | G06F 16/14 |
| 2020/0112620 A1* | 4/2020 | Juneja | G06F 16/9038 |

\* cited by examiner

QUANTILE DISTRIBUTION OF ACTIVITY AGE
IN HOURS FOR FEED IMPRESSION

| QUANTILE | ACTIVITY AGE IN HOURS POSITION 0 | ACTIVITY AGE IN HOURS POSITION 0-4 | ACTIVITY AGE IN HOURS POSITION 0-9 |
|---|---|---|---|
| 10% | 1.23 | 1.35 | 1.62 |
| 20% | 2.34 | 2.57 | 3.09 |
| 30% | 3.45 | 3.80 | 4.55 |
| 40% | 4.56 | 5.02 | 6.02 |
| 50% | 5.67 | 6.24 | 7.48 |
| 60% | 6.78 | 7.46 | 8.95 |
| 70% | 7.89 | 8.68 | 10.41 |
| 80% | 8.90 | 9.79 | 11.75 |
| 90% | 9.01 | 9.91 | 11.89 |

FIG. 6

LATENCY OPTIMIZATION FOR ONLINE SERVICE FEED

TECHNICAL FIELD

The subject matter disclosed herein generally relates to methods, systems, and machine-readable storage media for reducing the latency in providing a feed presented in a user interface.

BACKGROUND

Users on the Internet sometimes get frustrated when they have to wait a long time for information presented on the webpage, such as the information presented on a user feed of an online service (e.g., a social network service). On the other hand, users also want quality content.

When selecting content from a large corpus of documents, the online service has to sort through a large amount of information to get the information that most interests the user. However, sorting through a large amount of data usually takes a long time. If the user has to wait a long time to get the best content, the user will be unhappy with the outcome. Further, if the user does not have to wait a long time but receives uninteresting information, the user will also be unhappy with the outcome. Therefore, there is a trade-off between response time and quality of service.

What is needed is a system that can quickly provide good content that interests the user.

BRIEF DESCRIPTION OF THE DRAWINGS

Various of the appended drawings merely illustrate example embodiments of the present disclosure and cannot be considered as limiting its scope.

FIG. 6 is a table showing the distribution of activity age in hours for feed impressions, according to some example embodiments.

DETAILED DESCRIPTION

Figure 1:
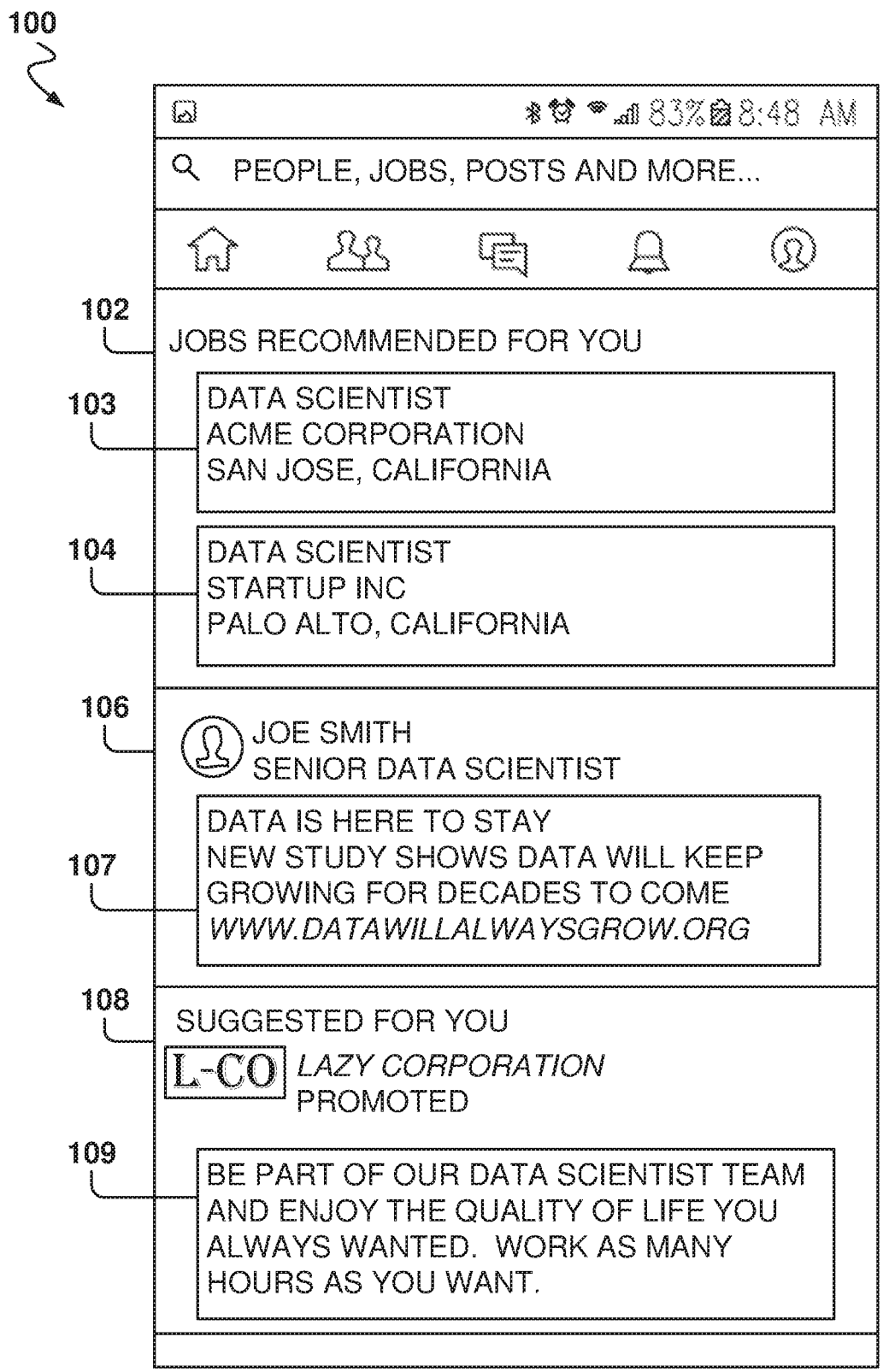
FIG. 1 is a screenshot of a user feed, according to some example embodiments.

Example methods, systems, and computer programs are directed to reducing the latency for providing a feed presented in a user interface. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, the overall feed serve time is reduced while providing quality content to the user. The result is improved user experience by quickly providing quality content, such as the user feed on a social networking service. An added benefit is an increased user participation because of the fast service and quality content delivered, which translates into potential increased revenue for the social networking service.

In some aspect, feed fetching is split into two different fetching processes, a fast one for the top feed updates and a slower one for additional updates. Additionally, a server cache stores cached data for feed updates and client applications fetch the top updates from the server cache. Further, the results from the different fetch operations are blended based on availability of the results for obtaining feed updates.

Artificial intelligence (AI) predictive models are used for determining which items are fed in the different fetch operations. Further, the AI models are used to predict the propensity of user visits to determine when to preload the user's cache feed.

With the fast fetch, a predetermined number of feed updates are served quickly by using a recency query that spans a predetermined number of the most recent hours. The slower fetch is used to serve the rest of the feed updates by performing a more thorough search and looking at an expanded horizon of updates (beyond the predetermined number of the most recent hours) for ranking.

The parameters associated with each of the fetch operations (e.g., number of most recent hours used for selecting updates, maximum number of updates selected for ranking) are tunable and are determined based on user information (e.g., the user's historical feed behavior) and predictive modeling.

It is noted that embodiments are presented with reference to providing a user feed, but the same principles may be applied to any type of search service, such as news, social networks, etc.

One general aspect includes a method that includes operations for receiving from a client device a request to access a user feed containing one or more posts and for performing a first query to search posts for the user feed. The first query uses a first time horizon delimiting a creation time of posts and a first maximum number of posts selected for ranking. The identified posts by the first query are sent to the client device for presentation on a user interface of the client device. Further, the method includes performing a second query to search posts for the user feed, where the second query uses a second time horizon that is greater than the first time horizon and a second maximum number of posts for ranking that is greater than the first maximum number of posts. The identified posts by the first query are merged with identified posts by the second query and the merged posts are sent to the client device for presentation of the merged posts on the user interface of the client device.

FIG. 1 is a screenshot of a user feed that includes items in different categories, according to some example embodiments. In the example embodiment of FIG. 1, the user feed 100 includes different categories, such as job recommendations 102, user posts 106, and sponsored items 108; other embodiments may include additional categories such as news, messages, articles, etc.

The user posts 106 include items 107 posted by users of the social network service (e.g., items posted by connections of the user), and may be comments made on the social network, pointers to interesting articles or webpages, etc.

In one example embodiment, a social network service user interface provides the job recommendations 102 (e.g., job posts 103 and 104) that match the job interests of the user and that are presented without a specific job search request from the user, referred to herein as "jobs you may be interested in" (JYMBII).

The sponsored items 108 are items 109 placed by sponsors of the social network, which pay a fee for posting those items on user feeds, and may include advertisements or links to webpages that the sponsors want to promote.

Although the categories are shown as separated within the user feed 100, the items from the different categories may be intermixed, and not just be presented as a block. Thus, the user feed 100 may include a large number of items from each of the categories, and the social network decides the order in which these items are presented to the user based on the desired utilities. Additionally, the user may receive in-network communications from other users. The communications may originate by other users who are socially connected with the user or by unconnected users.

Figure 2:
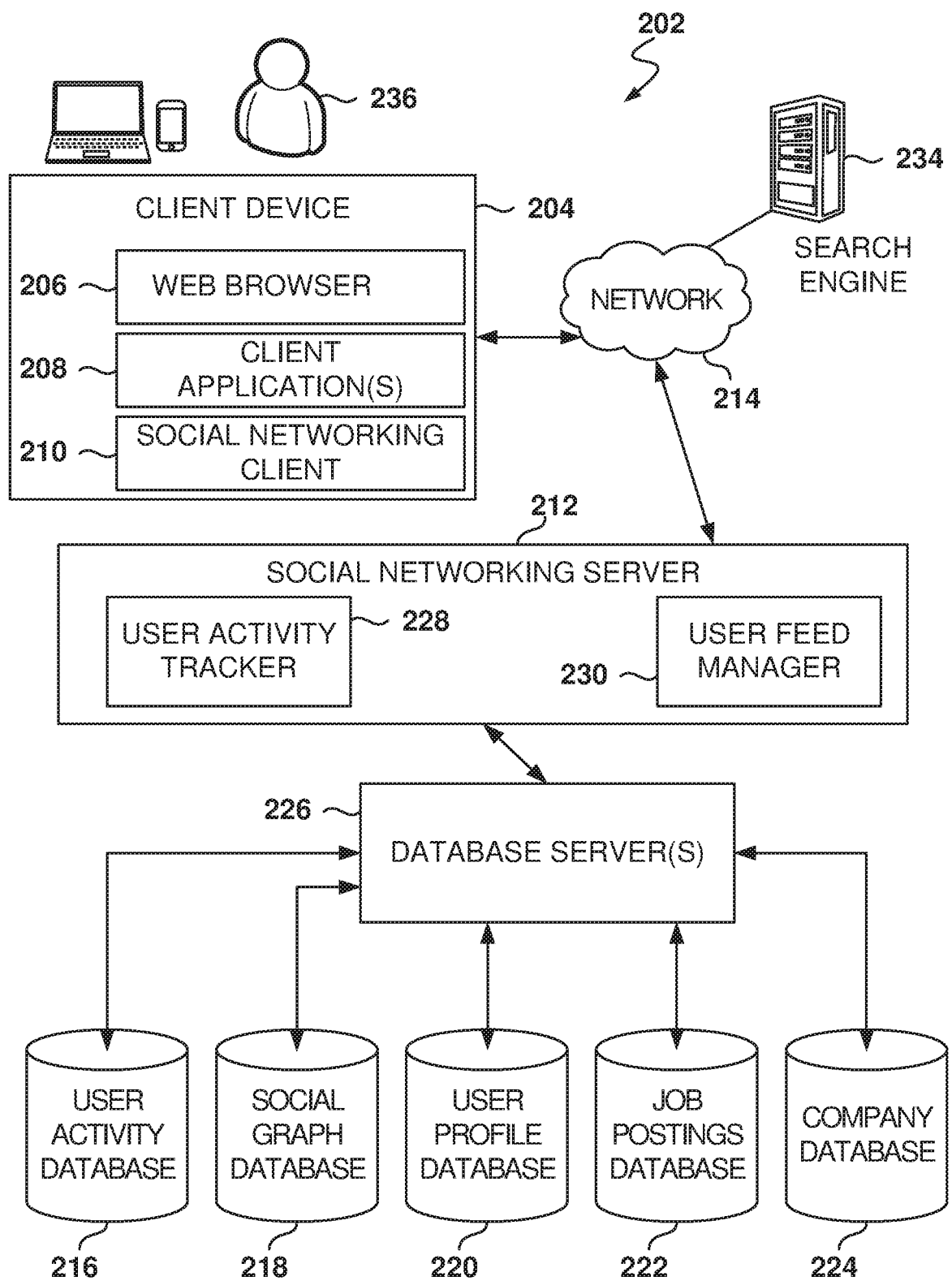
FIG. 2 is a block diagram illustrating a networked system, according to some example embodiments, including a social networking server, illustrating an example embodiment of a high-level client-server-based network architecture.

FIG. 2 is a block diagram illustrating a networked system, according to some example embodiments, including a social networking server 212, illustrating an example embodiment of a high-level client-server-based network architecture 202. Embodiments are presented with reference to an online service and, in some example embodiments, the online service is a social networking service.

The social networking server 212 provides server-side functionality via a network 214 (e.g., the Internet or a wide area network (WAN)) to one or more client devices 204. FIG. 2 illustrates, for example, a web browser 206, client application(s) 208, and a social networking client 210 executing on a client device 204. The social networking server 212 is further communicatively coupled with one or more database servers 226 that provide access to one or more databases 216-224.

The social networking server 212 includes, among other modules, a user activity tracker 228 and a user feed manager 230 that manages the creation and presentation of the user feed to the user 236. The user activity tracker captures statistical data about the user activity, such as frequency of access to the user feed, time spent on the user feed, activity on the social network service, etc. Each of the modules may be implemented in software, hardware, or any combination of software and hardware.

The client device 204 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 236 may utilize to access the social networking server 212. In some embodiments, the client device 204 may comprise a display module (not shown) to display information (e.g., in the form of user interfaces).

In one embodiment, the social networking server 212 is a network-based appliance that responds to initialization requests or search queries from the client device 204. One or more users 236 may be a person, a machine, or other means of interacting with the client device 204. In various embodiments, the user 236 interacts with the network architecture 202 via the client device 204 or another means.

The client device 204 may include one or more applications (also referred to as "apps") such as, but not limited to, the web browser 206, the social networking client 210, and other client applications 208, such as a messaging application, an electronic mail (email) application, a news application, and the like. In some embodiments, if the social networking client 210 is present in the client device 204, then the social networking client 210 is configured to locally provide the user interface for the application and to communicate with the social networking server 212, on an as-needed basis, for data and/or processing capabilities not locally available (e.g., to access a user profile, to authenticate a user 236, to identify or locate other connected users 236, etc.). Conversely, if the social networking client 210 is not included in the client device 204, the client device 204 may use the web browser 206 to access the social networking server 212.

In addition to the client device 204, the social networking server 212 communicates with the one or more database servers 226 and databases 216-224. In one example embodiment, the social networking server 212 is communicatively coupled to a user activity database 216, a social graph database 218, a user profile database 220, a job postings database 222, and a company database 224. The databases 216-224 may be implemented as one or more types of databases including, but not limited to, a hierarchical database, a relational database, an object-oriented database, one or more flat files, or combinations thereof.

The user profile database 220 stores user profile information about users 236 who have registered with the social networking server 212. With regard to the user profile database 220, the user 236 may be an individual person or an organization, such as a company, a corporation, a non-profit organization, an educational institution, or other such organizations.

In some example embodiments, when a user 236 initially registers to become a user 236 of the social networking service provided by the social networking server 212, the user 236 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 220. Similarly, when a representative of an organization initially registers the organization with the social networking service provided by the social networking server 212, the representative may be prompted to provide certain information about the organization, such as a company industry. This information may be stored, for example, in the company database 224.

As users 236 interact with the social networking service provided by the social networking server 212, the social networking server 212 is configured to monitor these interactions. Examples of interactions include, but are not limited to, commenting on posts entered by other users 236, viewing user profiles, editing or viewing a user 236's own profile, sharing content outside of the social networking service (e.g., an article provided by an entity other than the social networking server 212), updating a current status, posting content for other users 236 to view and comment on, posting job suggestions for the users 236, searching job postings, and other such interactions. In one embodiment, records of these interactions are stored in the user activity database 216, which associates interactions made by a user 236 with his or her user profile stored in the user profile database 220.

The job postings database 222 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database server(s) 226 are illustrated as a single block, one of ordinary skill in the art will recognize that the database server(s) 226 may include one or more such servers. Accordingly, and in one embodiment, the database server(s) 226 implemented by the social networking service are further configured to communicate with the social networking server 212.

The network architecture 202 may also include a search engine 234. Although only one search engine 234 is depicted, the network architecture 202 may include multiple search engines 234. Thus, the social networking server 212 may retrieve search results (and, potentially, other data) from multiple search engines 234. The search engine 234 may be a third-party search engine. Examples of the search engine 234 include Bing, Ask, and search engines provided by Google, Yahoo!, Baidu, and AOL.

Figure 3:
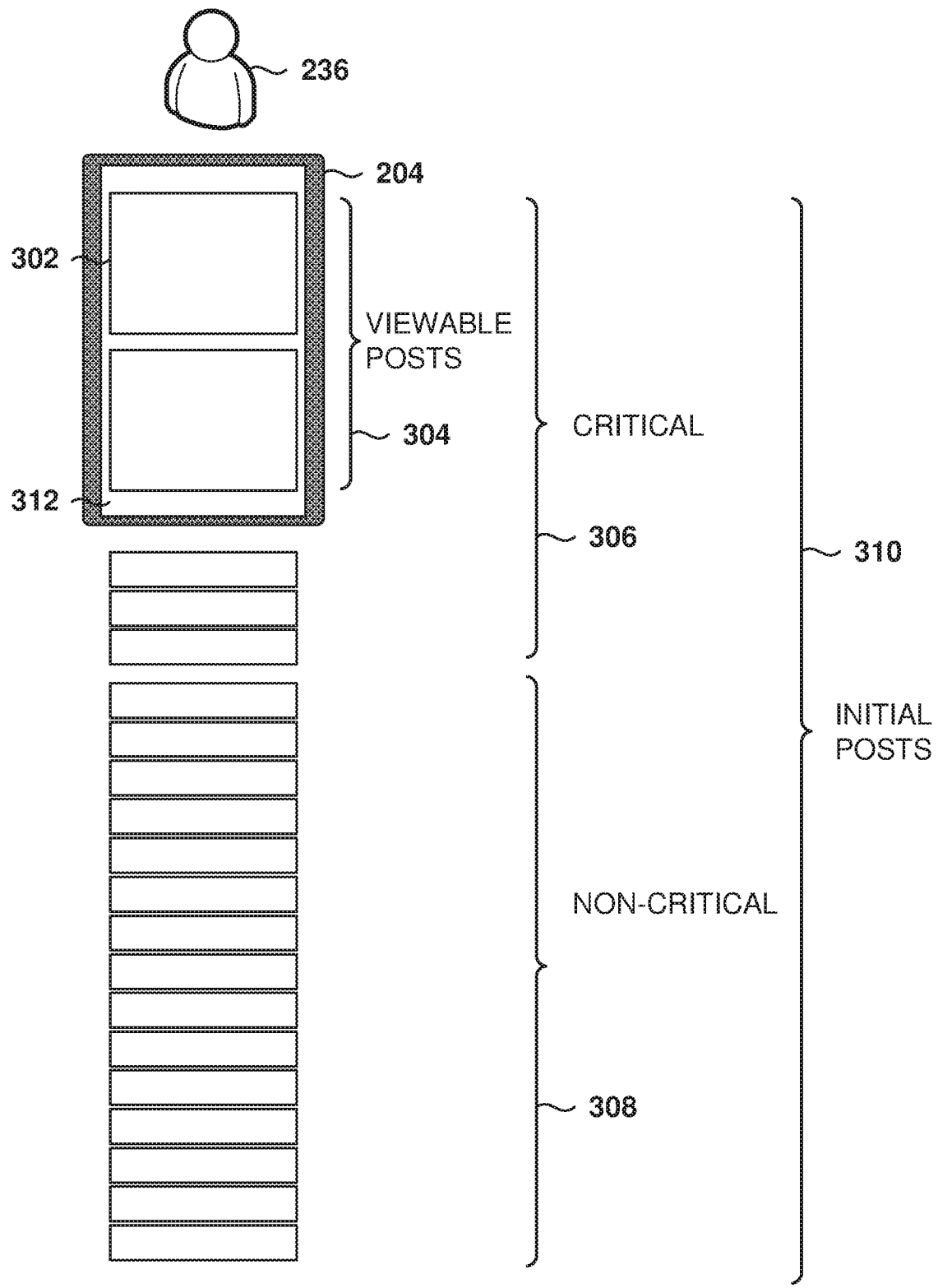
FIG. 3 illustrates the presentation of user feed posts in a user interface, according to some example embodiments.

FIG. 3 illustrates the presentation of feed posts 302 of the user feed in a user interface, according to some example embodiments. Typically, a large number of posts 302 are available to user 236 on the user feed that is presented on a user interface 312 of the client device 204.

In some example embodiments, the delivery of posts 302 is done in two phases: a first phase that delivers initial posts 310 and a second phase that delivers additional posts (not shown). The initial posts 310 are also referred to herein as top posts.

The initial posts may include, for example, 20 posts, although a different number of posts may be delivered, such as in the range from 2 to 100. However, not all the initial posts 310 are visible on the user interface 312 at the same time. A few posts are viewable posts 304 that are presented on the user interface 312, while the remainder of the posts remain in memory and available to the user 236 if the user decides to scroll down the user interface 312. Although two viewable posts 304 are illustrated in FIG. 3, a different number of viewable posts 304 may be available depending on the amount of space in the user interface 312 and the size of the viewable posts 304.

The number of posts to be ranked for the user feed may be in the order of tens of thousands or even more. One goal is to select the best posts as the initial posts, but in order to provided fast service, the goal may be relaxed to provide the best posts or posts with a high ranking score, the ranking score measuring the value of the feed to the user 236.

The initial posts 310 may be delivered at the same time or at different times. They initial posts 310 are divided into critical posts 306 and noncritical post 308, whether critical posts 306 include a predetermined number of the top initial posts. The critical posts 306 include enough posts such that the user's attention is not exhausted before the rest of the initial posts 310 (e.g., the non-critical posts 308) are available in the client device 204. Thus, the critical posts 306 include the viewable posts 304 and additional posts readily available in case the user decides to start scrolling down the user feed.

The number of critical posts 306 is a tunable parameter, for example, in the range from 3 to 50, although other values are also possible. The illustrated example in FIG. 3 includes five critical posts 306, the top two being that viewable posts 304.

In one scenario, the initial posts 310 are divided into five critical posts 306 and 15 non-critical posts 308. The critical posts 306 are sent to the client device 204 quickly to provide a fast response to the user, while the non-critical posts 308 are sent a little bit later because there is extra time as the user 236 will be busy accessing the critical posts 306.

In some example embodiments, the viewable posts 304 may be preloaded in the client device 204 (e.g., by a dedicated app) and ready for the user right away. The non-critical posts 308 may be delayed three seconds as the social networking server searches and ranks the available feed updates. The delay may be higher on lower and may depend on the location of the user, connectivity speeds, etc.

By dividing into two phases how the posts 302 are delivered to the client device 204, it is possible to provide some high-quality updates very quickly and still be able to allow some extra time to perform a thorough search of the available feed updates in order to select the best available updates for the user 236. This way, the user 236 guest fast service and quality feed content.

Figure 4:
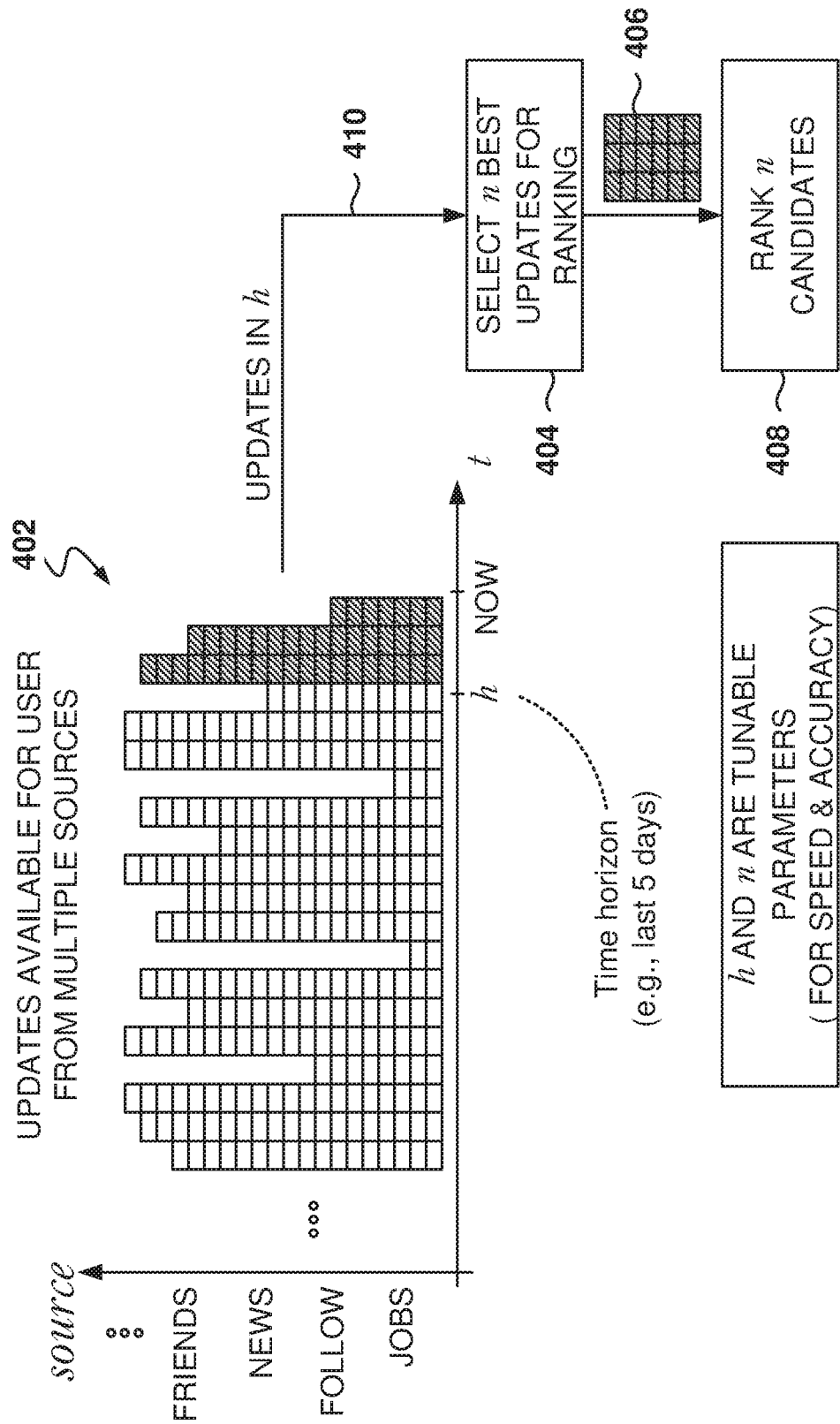
FIG. 4 illustrates the tunable parameters for selecting user feed posts, according to some example embodiments.

FIG. 4 illustrates the tunable parameters for selecting user feed posts, also referred to as updates, according to some example embodiments. In some example embodiments, the corpus of possible feed updates may have a size of hundreds of thousands of records from which to choose the best updates. The source of the records may be of different kinds of messages friend's posts, news articles, items posted by followed users or companies, job postings, etc. In some example embodiments, the records are sorted by time.

In some example embodiments, instead of classifying posts between critical and non-critical, the posts are classified based on a different criterion, such as the source of the post (e.g., from a social connection versus from another source, degrees of separation from the user). The closeness of the social connection can be determined based on historical interactions or user profiles, e.g., a colleague from work or university, the number of common friends, etc.

When selecting the critical updates, (operation referred to as the critical path), a plurality of updates 410 posts from the most recent days are considered as candidates. In some example embodiments, the updates are stored in chronological order; therefore, selection of the most recent updates can be performed quickly. This selection reduces the size of the candidates, e.g., from hundreds of thousands to tens of thousands or less. The number of most recent days consider is referred to as the time horizon h, which is a tunable parameter. For example, h may be 14 days to cover the updates from the last two weeks, but other values in the range from 1 to 31 days, or more, may be considered. In other example embodiments, h may be measured in hours, as in selecting updates for the last four hours.

At operation 404, a predetermined number n of the best updates within time horizon h are selected. For example, 10,000 updates are selected for ranking, but n may be any number as configured and tuned by the system.

At operation 408, the n selected updates are ranked based on the value to the user (e.g., based on the user profile, the source of the updates, the interests of the user, etc.). Then, a predetermined number of the top ranked candidates are selected as the critical updates for the user feed.

Figure 5:
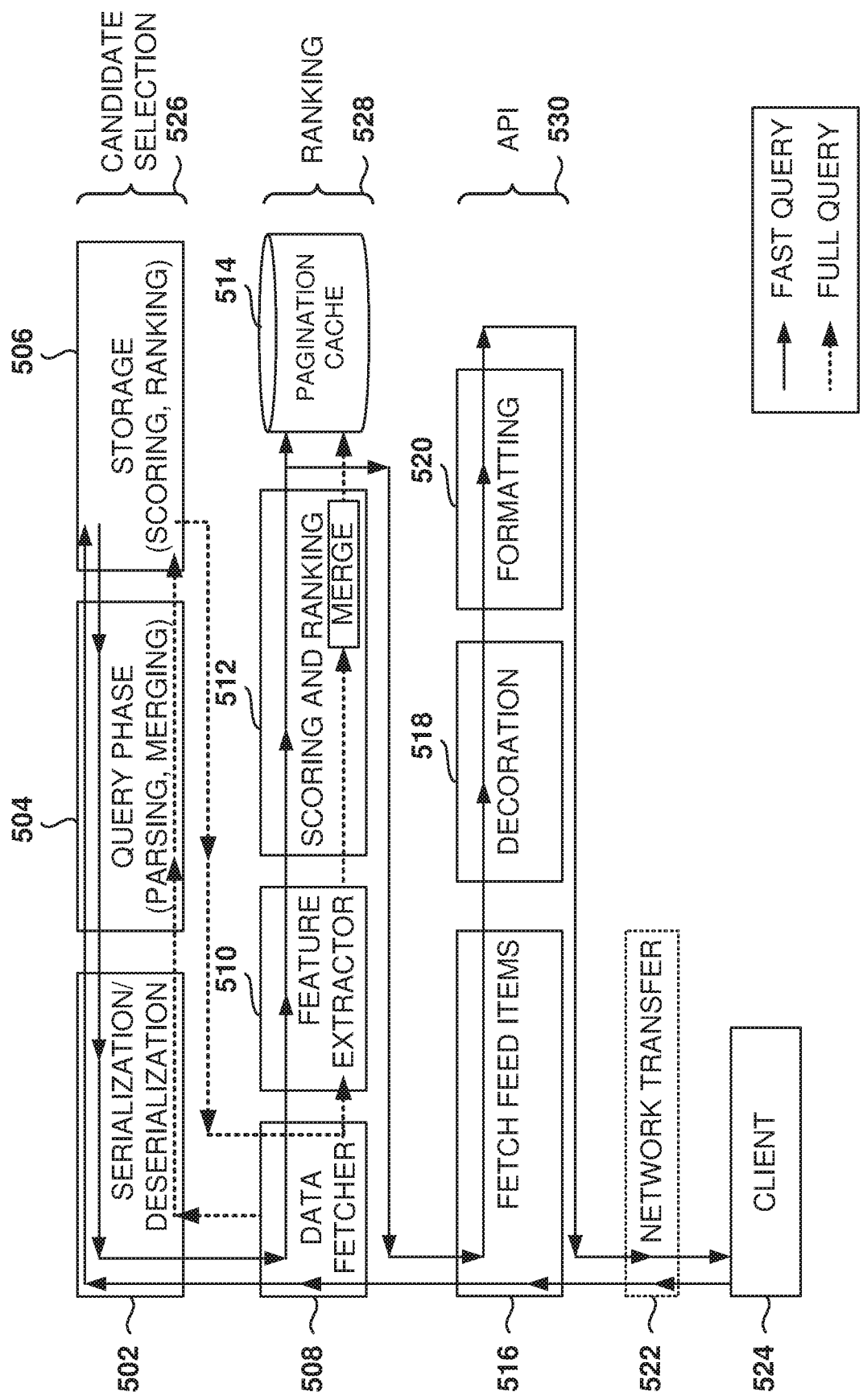
FIG. 5 is an example system architecture for implementing embodiments.

FIG. 5 is an example system architecture for implementing embodiments. The system architecture provides the critical updates to the user very quickly while evaluating in parallel additional updates that require a little bit more time than provide higher ranking scores. The critical updates are obtained using a fast query while the additional updates are obtained using a full query. The results of the fast query are delivered to the user first while the full query continues to operate in the background.

The client 524 sends the request, via a network transfer 522, to the API layer 530, which forwards to the ranking stage 528, which forwards to the candidate selection stage 526.

The candidate selection stage 526 includes serialization/deserialization 502, a query phase 504 for parsing and merging, and a storage module 506 that retrieves updates and performs scoring and ranking of the updates. During the fast query, the candidate selection stage 526 retrieves n updates from the last h hours, which is a fast operation because the updates are stored in chronological order.

The ranking stage 528 includes data fetcher 508, a feature extractor 510, scoring and ranking 512, and a pagination cache 514. The ranking stage 528 receives the n updates and proceeds to score and rank the n updates.

At the ranking stage 528, a more comprehensive scoring model is applied than at the follow-feed layer 525. The resulting sorted list of updates is then stored in the pagination cache 514 and the critical updates (e.g., the top 20 updates) from the sorted list are returned to the API layer 530. In some example embodiments, the pagination cache 514 is used for subsequent page fetches for this user within the current session.

The API layer 530 includes fetch feed items module 516, decoration module 518, and formatting module 520. The API layer 530 receives the critical from the feed-mixer layer and proceeds to do decoration and formatting of the critical updates, which are then transmitted back to the client 524. The decoration and formatting is fast because it is performed on a reduced set of results, as compared to the full query. The client 524 performs additional parsing, model binding, layout calculations, and rendering to present the viewable posts on the screen.

Additionally, the ranking stage 528 sends separately the full query to the candidate selection stage 526, which performs a more thorough search of updates without the limitation of the time horizon window, that is, the full query will search for items that expand beyond the last h hours.

In some example embodiments, the full query also has a time horizon, but a bigger time horizon than that fast query. For example, the full query may have a time horizon of 30 days so the search of items will be performed on the items created within the last 30 days (as opposed to the fast query that may look at a horizon, for example, of five days). The time horizon for the full query may be in the range from 6 to 180 days, although other values are also possible. In some example embodiments, the candidate selection stage 526 returns a larger number of updates (e.g., 500) to the ranking stage 528 than the fast query.

After the rendering of updates is completed on the client 524, there is a second network call (not shown), performed in the background while the user accesses the updates on the feed, made from the client 524 to fetch the additional feed updates. The app in the client 524 does not have to wait for the member to scroll down before making this second feed fetch call.

Further, in the ranking stage 528, the results from the fast query and the full query are merged and deduplicated, and the resulting set of ranked updates is stored in the pagination cache 514. The merge means selecting the best ranked scores. Since the fast query did not access all the available updates, the full query may find some updates with higher ranking scores. However, the response to the user must be consistent so the top updates from the fast query are kept on top, while the additional updates are selected from the best updates from the full query that are not already included in the critical updates for the fast query.

The response to the second network call from the client 524 is served from the merged results in the pagination cache 514, which includes the merged results from the fast query and the full query.

By using the fast query and the full query, the response time is improved because the fast query operates on fewer updates. In some cases, it is expected that the response time will improve 30% to 50%.

FIG. 6 is a table showing the distribution of activity age in hours for feed impressions, according to some example embodiments. Methods are provided for tuning the search parameters, such as n and h described above. Further, the search parameters may be tuned by group of users (e.g., users with the same characteristics) or by a single user, where each user has custom parameters. For example, some users may use the social network service every day, while other users may use the social network service every week or every month. The parameters for theses different types of users are tuned differently to meet their different demands.

Table 602 shows a statistical analysis of the age of user posts based on location within the user feed (e.g., position zero is the first shown post) and the age of the post. The first column shows the quantile band, the second column indicates the age of post 0 in hours, the third column shows the age for positions 0-4, and the fourth column shows the age for positions 0-9. It is noted that the embodiments illustrated in table 602 are examples and other scenarios may show different statistics. The embodiments illustrated in table 602 should therefore not be interpreted to be exclusive or limiting, but rather illustrative.

For example, more than 80% of the updates, for positions 0-4, are from the last 9.79 hours. From the table 602, it can be deduced than about 70% of the updates in the first position are from within the last 8 hours, and that for positions 0-4, more than 50% of the updates are from the last 6.24 hours. Further, the distribution for the first update (position 0) is similar to the distribution for the first five updates. It is noted that the values in table 602 are for illustration purposes and the actual values on the social networking service may vary from those illustrated.

These numbers may be recalculated periodically and analyze the performance of different n and h values. In prior solutions, there was an assumption that it is not known when the user will access the feed. However, in some example embodiments, a prediction is made on when a particular user will access the feed. The prediction is made using a machine-learning (ML) model, as described below with reference to FIG. 10.

In some example embodiments, the ML model provides a probability that the user will access the feed within a certain number of hours from the present time (e.g., one hour, four hours). Based on the prediction, if the system determines that the user is going to access the feed soon (e.g., a probability higher than a predetermined threshold to access the feed within the next hour), the social networking service can calculate the user feed items in advance and then place them on the pagination cache 514 of FIG. 5. This way, when the user accesses the feed, the response will be very fast because the updates are already in the pagination cache 514.

In some example embodiments, a client cache is used to preload the user feed on the client device. Therefore, when the probability indicates that the user will access the feed soon, the critical posts (or even the initial posts) are preloaded on the client device cache, which means in almost instantaneous response to the user when accessing the user feed.

Figure 7:
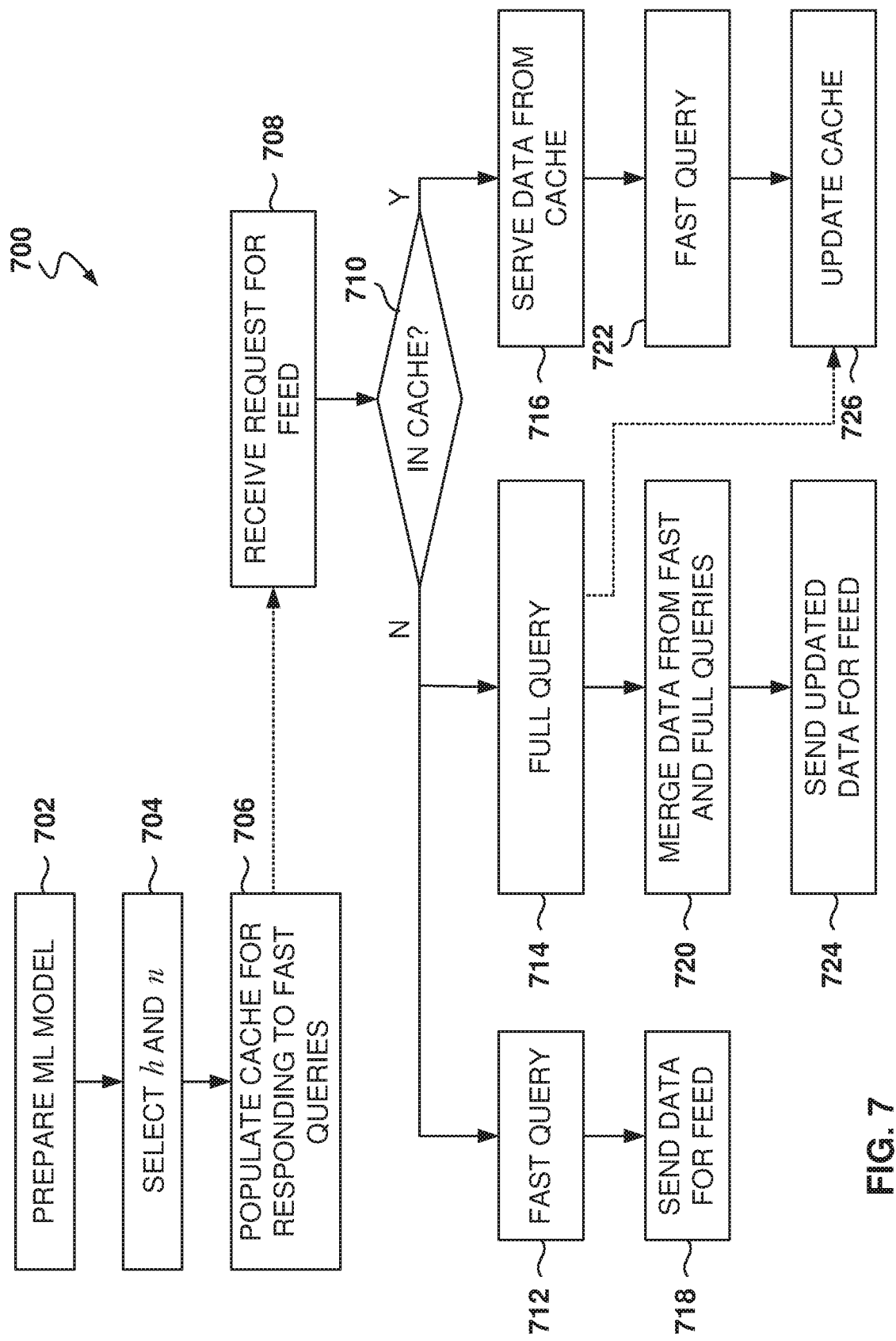
FIG. 7 is a flowchart of a method for creating user feed data, according to some example embodiments.

FIG. 7 is a flowchart of a method 700 for creating user feed data, according to some example embodiments. While the various operations in this flowchart are presented and described sequentially, one of ordinary skill will appreciate that some or all of the operations may be executed in a different order, be combined or omitted, or be executed in parallel.

At operation 702, the ML model is prepared, such as by performing training using training data set, as described below with reference to FIG. 10. The ML model calculates the probability that the user will access the user feed within a predetermined amount of time (e.g., 1 hour, 30 minutes).

At operation 704, the parameters h and n are selected for the user based on the probability that the user will access the feed within the predetermined amount of time. In other example embodiments, the parameters h and n are selected based on the user's past historical access and interaction patterns, or the user's profile features, or any combination thereof. From operation 704, the method 700 flows to operation 706 where the server cache is populated with user feed information to respond to fast queries. Operation 702, 704, and 706 may be performed periodically, or at certain times based on the characteristics of the user.

At operation 708, a request is received from a user for access in the feed. At operation 710, a check is made to determine if the critical posts are available in the pagination cache. If the critical posts are in the cache, the method 700 flows to operation 716, and if the critical posts are not in the cache, then operations 712 and 714 are performed.

At operation 716, the data for the critical posts is read and sent to the client device. From operation 716, the method 700 flows to operation 722 where a fast query is also performed in order to update the cache data in the pagination cache (operation 726). This way, when a full query is received, the data in the pagination cache will be accurate since it has been calculated recently. In some example embodiments, the pagination cache holds the critical posts, and in other example embodiments, the pagination cache holds the critical and that non-critical posts.

In other example embodiments, the cached updates are blended with the fast query results and served to the client device so that the served feed is both fast and relevant. In other example embodiments, the fast query call 722 is made first to get the freshest updates and then these updates are blended (as in operation 720) and then served from cache as in operation 716.

At operation 712, the fast query is performed as illustrated above with reference to FIG. 5. The results of the fast query are sent to the client device at operation 718.

Further, the full query 714 is performed to obtain the non-critical posts and data in the pagination cache is updated (operation 726). The results from the fast query will be obtained much faster than those in the full query because the fast query handles a smaller number of updates, smaller time horizon. Further, the results from the fast query in the full query are merged so the critical updates from both queries are the same and the user feed will be consistent with additional posts are sent to the client device (operation 724).

Further, the pagination cache may be updated periodically by performing full queries at different times (e.g., daily, every 12 hours). Further, another process may be used to determine when the data in the pagination cache is obsolete and delete it from the pagination cache.

In some example embodiments, default h and n values are calculated so when the values are not available for a user (e.g., a new user on the social network service), then the default h and n values are used. In other example embodiments, the h and n values are calculated by category and the users within the category are associated with the h and n values of the category. Examples of categories include groups by frequency of access to the social network service, country of residence, user skills, etc.

Figure 8:
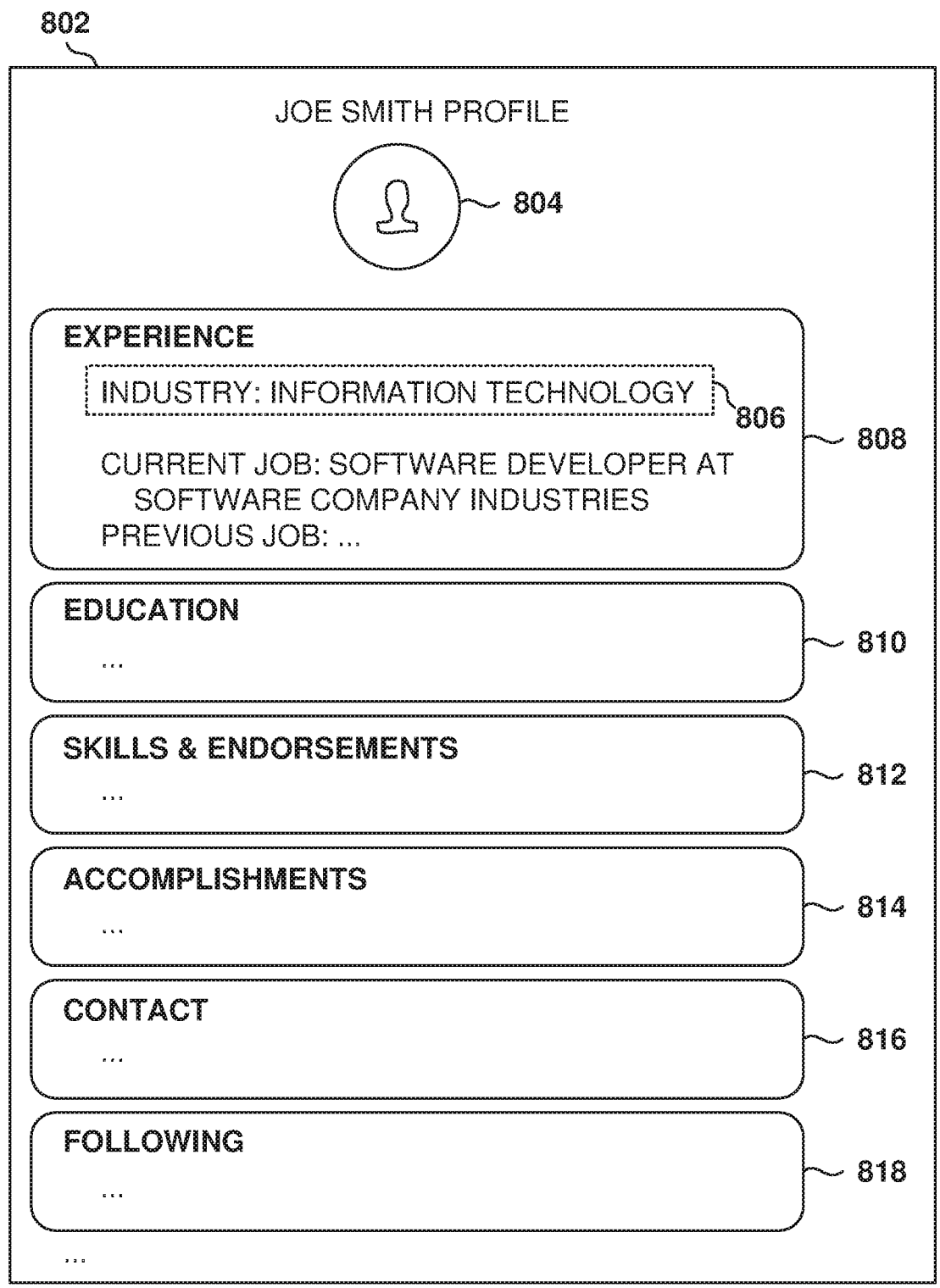
FIG. 8 is a screenshot of a user's profile view, according to some example embodiments.

FIG. 8 is a screenshot of a user's profile view, according to some example embodiments. Each user in the social networking service has a user profile 802, which includes information about the user (e.g., the user 236 of FIG. 2). The user profile 802 is configurable by the user and also includes information based on user activity in the social networking service (e.g., likes, posts read).

In one example embodiment, the user profile 802 may include information in several categories, such as experience 808, education 810, skills and endorsements 812, accomplishments 814, contact information 816, following 818, language, and the like. Skills include professional competences that the user has, and the skills may be added by the user or by other users of the social networking service. Example skills include C++, Java, Object Programming, Data Mining, Machine Learning, Data Scientist, Spanish, and the like. Other users of the social networking service may endorse one or more of the skills and, in some example embodiments, the account is associated with the number of endorsements received for each skill from other users.

The experience 808 category of information includes information related to the professional experience of the user. In one example embodiment, the experience 808 information includes an industry 806, which identifies the industry in which the user works. Some examples of industries configurable in the user profile 802 include information technology, mechanical engineering, marketing, and the like. The experience 808 information area may also include information about the current job and previous jobs held by the user.

The education 810 category includes information about the educational background of the user, including educational institutions attended by the user. The skills and endorsements 812 category includes information about professional skills that the user has identified as having been acquired by the user, and endorsements entered by other users of the social networking service supporting the skills of the user. The accomplishments 814 area includes accomplishments entered by the user, and the contact information 816 includes contact information for the user, such as email and phone number. The following 818 area includes the name of entities in the social networking service being followed by the user.

Figure 9:
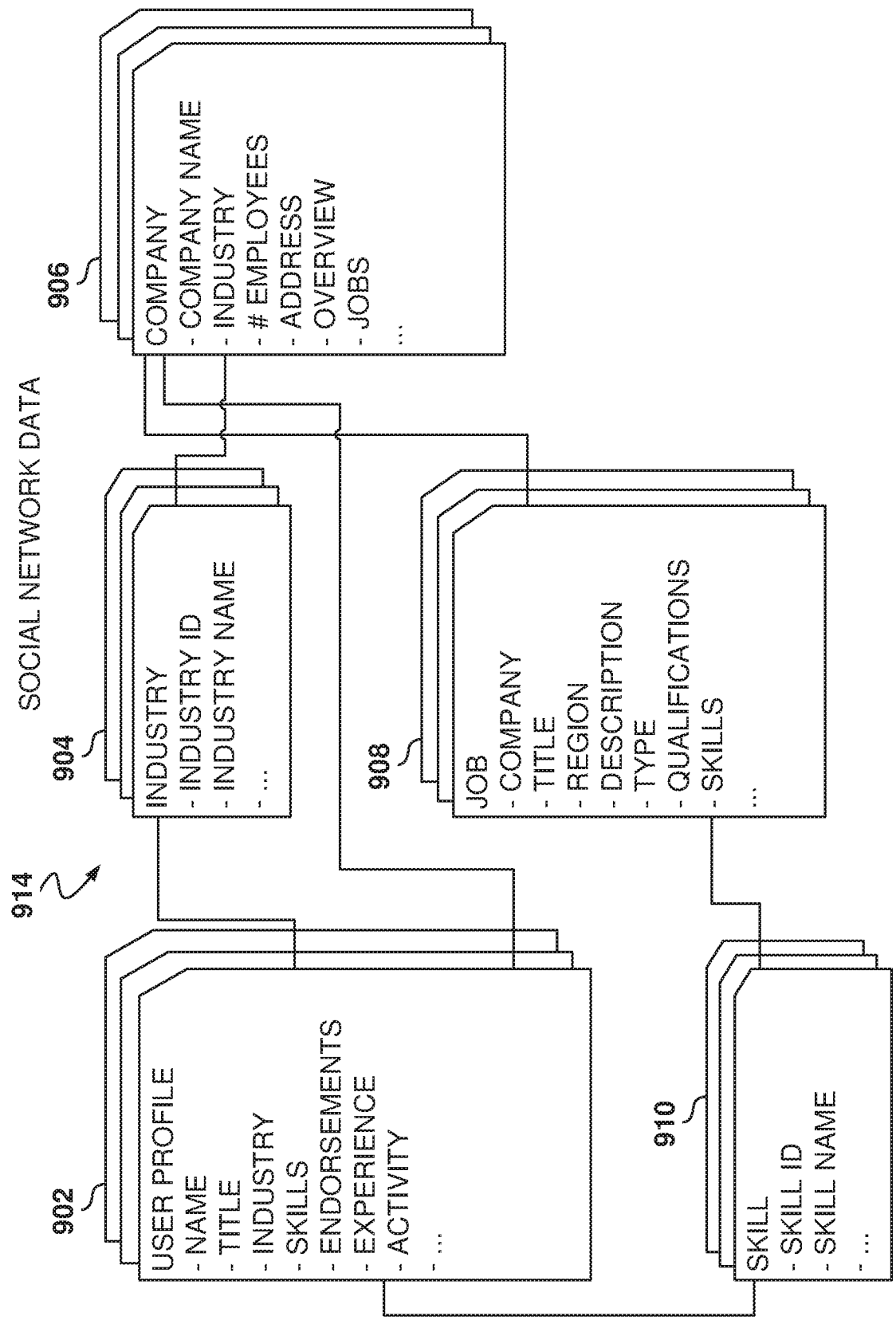
FIG. 9 illustrates data structures for storing social network data 914, according to some example embodiments.

FIG. 9 illustrates data structures for storing social network data 914, according to some example embodiments. Each user in the social network has a member profile 902, which includes information about the user. The member profile 902 is configurable by the user and includes information about the user and about user activity in the social network (e.g., items liked, posts read, jobs applied).

In one example embodiment, the member profile 902 may include information in several categories, such as experience, education, skills and endorsements, accomplishments, contact information, following, and the like. Skills include professional competences that the member has, and the skills may be added by the member or by other members of the social network. Example skills include C++, Java, Object Programming, Data Mining, Machine Learning, Data Scientist, and the like. Other members of the social network may endorse one or more of the skills and, in some example embodiments, the account is associated with the number of endorsements received for each skill from other members.

The member profile 902 includes member information, such as name, title (e.g., job title), industry (e.g., legal services), geographic region, jobs, skills and endorsements, and so forth. In some example embodiments, the member profile 902 also includes job-related data, such as employment history, jobs previously applied to, or jobs already suggested to the member (and how many times the job has been suggested to the member). The experience information includes information related to the professional experience of the user, and may include, for each job, dates, company, title, super-title, functional area, industry, etc. Additionally, the user profile 902 includes data on the activity of the user on the social network service, such as frequency of access to the social network service. Within member profile 902, the skill information is linked to skill data 910, the employer information is linked to company data 906, and the industry information is linked to industry data 904. Other links between tables may be possible.

The skill data 910 and endorsements includes information about professional skills that the user has identified as having been acquired by the user, and endorsements entered by other users of the social network supporting the skills of the user. Accomplishments include accomplishments entered by the user, and contact information includes contact information for the user, such as email and phone number.

The industry data 904 is a table for storing the industries identified in the social network. In one example embodiment, the industry data 904 includes an industry identifier (e.g., a numerical value or a text string), and an industry name, which is a text string associated with the industry (e.g., legal services).

In one example embodiment, the company data 906 includes company information, such as company name, industry associated with the company, number of employees, address, overview description of the company, job postings, and the like. In some example embodiments, the industry is linked to the industry data 904.

The skill data 910 is a table for storing the different skills identified in the social network. In one example embodiment, the skill data 910 includes a skill identifier (ID) (e.g., a numerical value or a text string) and a name for the skill. The skill identifier may be linked to the member profile 902 and job data 908.

In one example embodiment, job data 908 includes data for jobs posted by companies in the social network. The job data 908 includes one or more of a title associated with the job (e.g., software developer), a company that posted the job, a geographic region for the job, a description of the job, job type (e.g., full time, part time), qualifications required for the job, and one or more skills. The job data 908 may be linked to the company data 906 and the skill data 910.

It is noted that the embodiments illustrated in FIG. 9 are examples and do not describe every possible embodiment. Other embodiments may utilize different data structures, fewer data structures, combine the information from two data structures into one, add additional or fewer links among the data structures, and the like. The embodiments illustrated in FIG. 9 should therefore not be interpreted to be exclusive or limiting, but rather illustrative.

Figure 10:
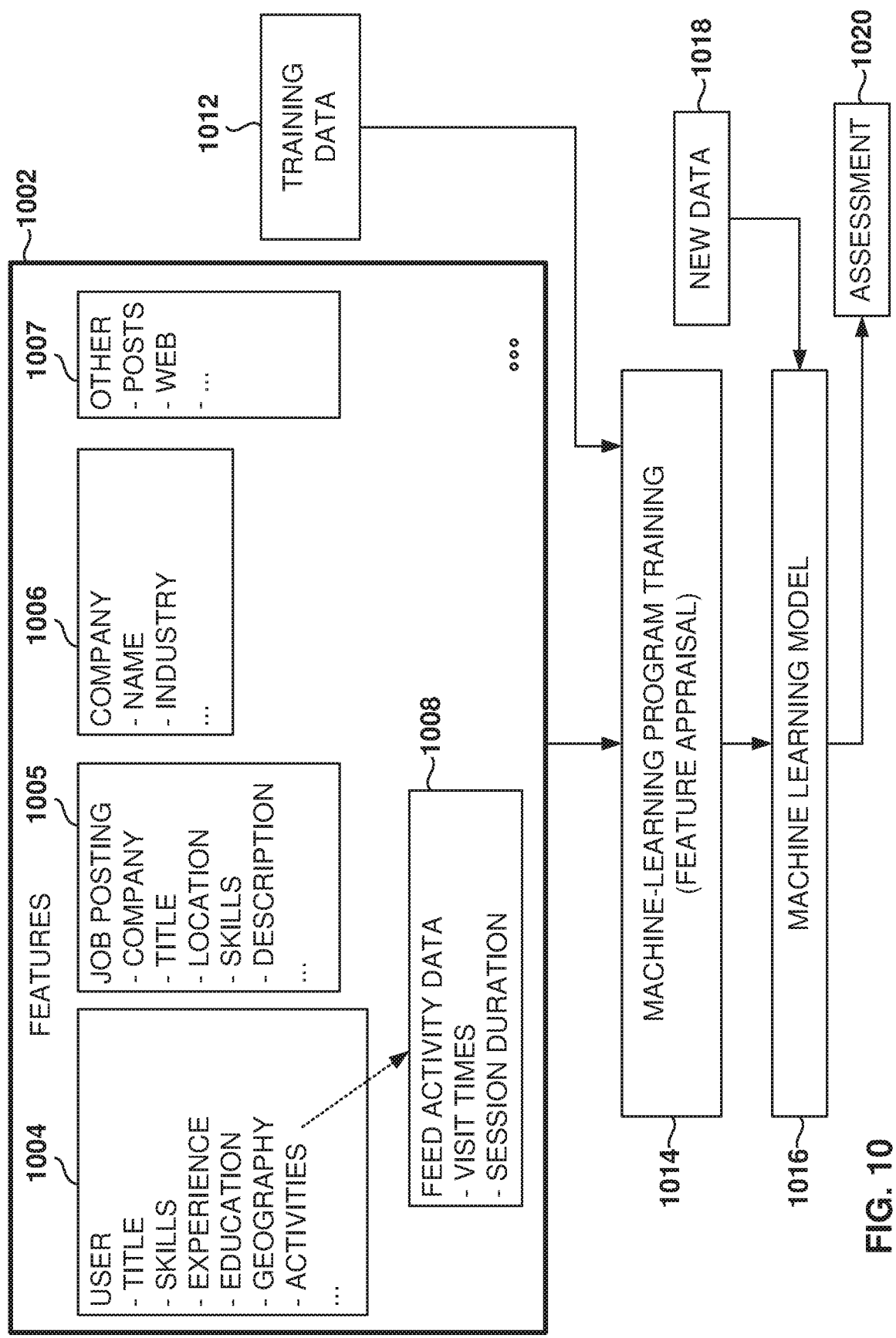
FIG. 10 illustrates the training and use of a machine-learning program, according to some example embodiments.

FIG. 10 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1012 in order to make data-driven predictions or decisions expressed as outputs or assessments 1020. Although example embodiments are presented with respect to a few machine-learning tools, the principles presented herein may be applied to other machine-learning tools.

In some example embodiments, different machine-learning tools may be used. For example. Logistic Regression (LR), Naive-Bayes, Random Forest (RF), neural networks (NN), deep neural networks (DNN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 1012 to find correlations among identified features 1002 that affect the outcome.

The machine-learning algorithms utilize features 1002 for analyzing the data to generate assessments 1020. A feature 1002 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 1002 may be of different types and may include one or more of user features 1004, job-posting features 1005; company features 1006; and other features 1010 (user posts, web activity, followed companies, etc.). The user features 1004 include feed activity data 1008 which describes the activities of the user when accessing the user fee, such as visit times and session duration. The features 1002 may include all or part of the social network data 914, as described above with reference to FIG. 9. The data sources include member standardized data, jobs standardized data, member connections, member employment preferences, job views, job applied, job information, salary information, etc.

The ML algorithms utilize the training data 1012 to find correlations among the identified features 1002 that affect the outcome or assessment 1020. In some example embodiments, the training data 1012 includes known data for one or more identified features 1002, such as the sessions of the users and their durations, etc.

With the training data 1012 and the identified features 1002, the ML algorithm is trained at operation 1014. The ML training appraises the value of the features 1002 as they correlate to the training data 1012. The result of the training is the ML model 1016.

When the machine-learning program 1016 is used to perform an assessment, new data 1018 is provided as an input to the trained machine-learning program 1016, and the machine-learning program 1016 generates the assessment 1020 as output. For example, the machine-learning program may be used to provide a ranking score for a job post, and the ranking score may be used to sort the data results before presentation to the user. Further, another machine-learning program, referred to herein as the shutter speed machine-learning program, may be used to calculate the parameter preference scores, as described above.

In some example embodiments, the ML model is used to calculate the probability that a user accesses the user feed within a predetermined amount of time (e.g., one hour).

In some example embodiments, categories are defined and users are assigned to those categories. The ML model calculates the probability that a user in a certain category accesses the user feed. The features 1002 and the training data identify the list of possible categories.

Some examples of categories include new users (e.g., users that join the social network service within the last six months or some other predefined period), frequency of access, country where social network is accessed, number of connections on the social network, etc. For frequency of access, different access frequency bands are defined and users are categorized according to those access frequency bands. For example, daily access, access with a frequency between one and two days, access between two days and weekly, access between weekly and monthly, etc.

The country of access category is valuable and the network connectivity speeds changes substantially from country to country. In some example embodiments, probabilities for one or more categories of the user may be calculated and combined to determine a final probability, which leads to the determination of the tuning parameters h and n.

Further, in some example embodiments, the social network service since notifications to the client device of the user (e.g., you have a new message from Joe). When users receive notifications, the probability that the user accesses the feed increases. Therefore, in some example embodiments, when a notification is sent, a full query is performed to update the pagination cache with the latest information.

Figure 11:
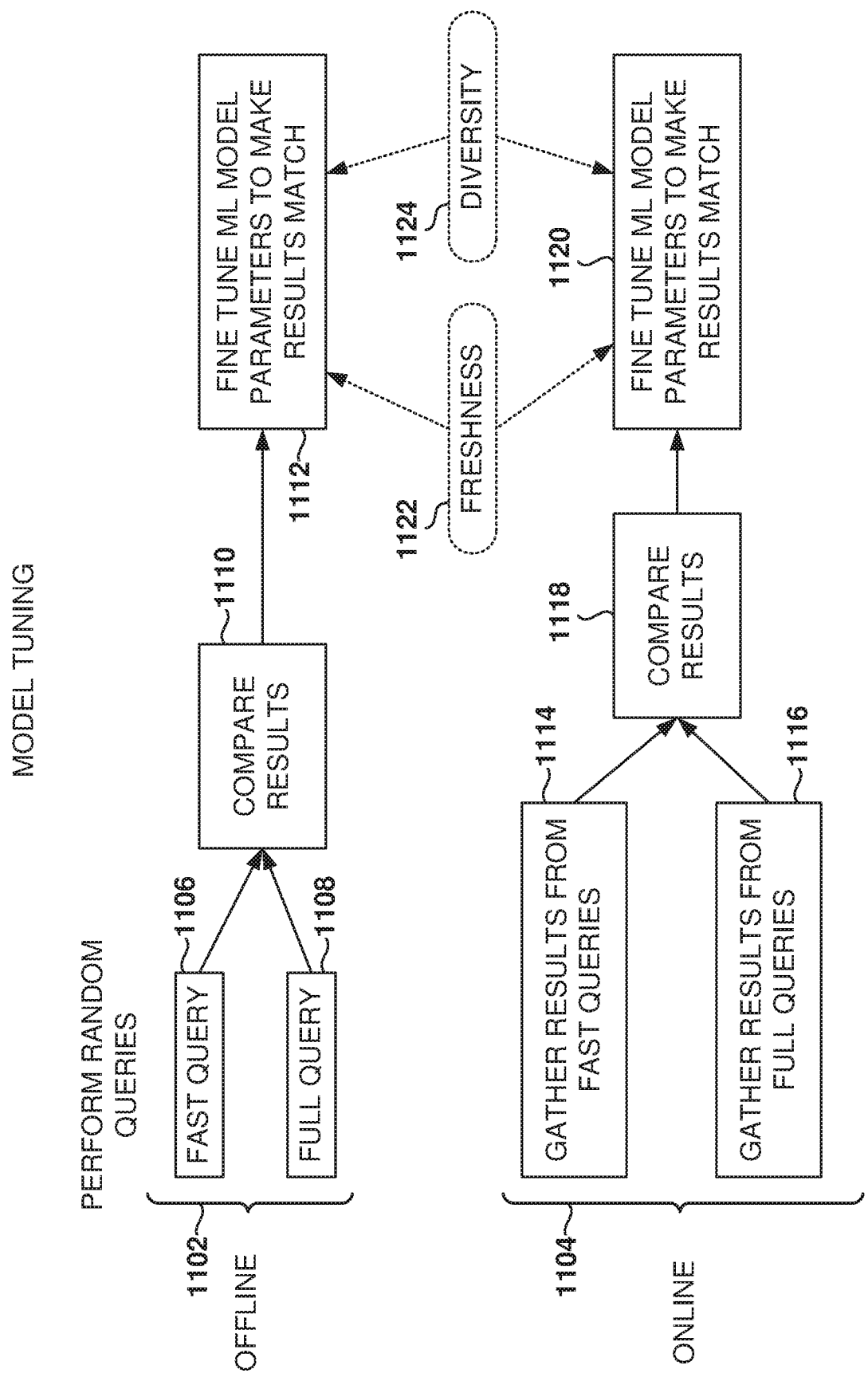
FIG. 11 illustrates the tuning of the model for selecting posts for the user feed, according to some example embodiments.

FIG. 11 illustrates the tuning of the model for selecting posts for the user feed, according to some example embodiments. In some example embodiments, the ML model and the selection of the tunable parameters are tuned in order to have the critical posts be the same, or substantially similar, for the first query on the form query. That is, the fast query excels at quickly obtaining the best critical posts because it would be detrimental to the user satisfaction to have quick response time but presenting less-than-optimal critical updates. This model tuning is referred to as recall tuning because it tunes the ability of the system to recall the best posts.

There are two embodiments for tuning the system. In one example embodiment, offline tuning 1102 is performed. Random queries are performed in parallel with the same parameters (e.g., user, time of day) that include the fast query 1106 and the full query 1108. The results of the two queries are compared at operation 1110.

At operation 1112, the ML model, the h parameter, and the n parameter are tuned. For example, if the response time of the fast query is too long, the time horizon h or the number of updates n can be reduced. On the other hand, if the results for the fast query and the full query do not match, or there are only one or few matches, h and n may be increased to improve accuracy.

As a result of the recall tuning, the h and the n may be set for a user, or a category of users. For example, h may be set to 12 hours and n to 500 in one case, or h may be set to 24 hours and n to 1000 in another case. Additionally, the ML model used may be tested and the best ML model (as well as the ML model parameters selected. For example, logistic regression may be used as the ML model.

Further, the parameters for the feed search may be tuned. There are many parameters in the feed search, but some parameters are freshness 1122 and diversity 1124. Users like to see fresh updates (e.g., recent updates) and also like to see the diversity. For example, if the user feed only shows news but does not show updates from social connections, the user satisfaction will decrease.

Based on the testing and the comparison of results from operation 1110, the search engine may be tuned by adjusting the freshness 1122 and diversity 1124 parameters. Freshness refers to the age of the post or to the perceived age of the post by the user. The perceived age of the post depends on both the age of the post and the last time the user visited the social network service. Diversity refers to the variety in post creators, post types, post sources, and post topics, where the creator is the entity responsible for creating the post. The post type refers to the type of the post, such as whether the post is an article, a job posting, a video, etc. The post topic is the semantic topic of the post, such as politics, sports, machine learning, etc., or the post topic may also refer to a hashtag in the post, (e.g., #ai, #nfl).

In another example embodiment, online tuning 1104 is performed. At operation 1114, the results from fast queries performed for users are gathered, as well as the associated (search for the same parameters) results from full queries at operation 1116. At operation 1118, the results are compared, and at operation 1120, the system parameters may be tuned, as described above with reference to operation 1112.

Figure 12:
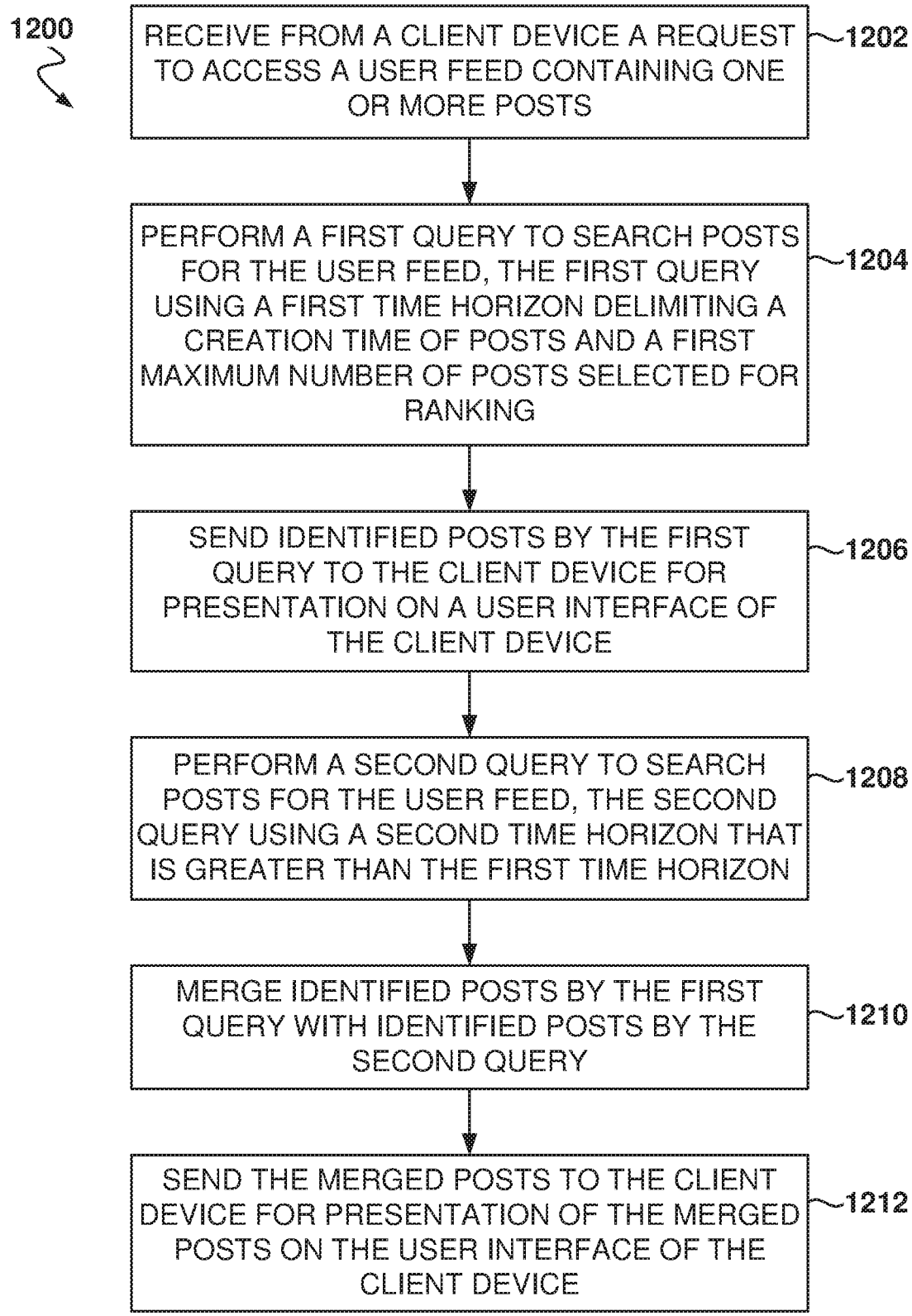
FIG. 12 is a flowchart of a method for reducing the latency for providing a feed presented in a user interface, according to some example embodiments.

FIG. 12 is a flowchart of a method 1200 for reducing the latency for providing a feed presented in a user interface, according to some example embodiments. While the various operations in this flowchart are presented and described sequentially, one of ordinary skill will appreciate that some or all of the operations may be executed in a different order, be combined or omitted, or be executed in parallel.

Operation 1202 is for receiving, by one or more processors, from a client device a request to access a user feed containing one or more posts.

From operation 1202, the method 1200 flows to operation 1204 where the one or more processors perform a first query to search posts for the user feed. The first query uses a first time horizon delimiting a creation time of posts and a first maximum number of posts selected for ranking.

From operation 1204, the method 1200 flows to operation 1206 for sending, by the one or more processors, identified posts by the first query to the client device for presentation on a user interface of the client device.

From operation 1206, the method 1200 flows to operation 1208 where the one or more processors perform a second query to search posts for the user feed. The second query uses a second time horizon that is greater than the first time horizon and a second maximum number of posts for ranking that is greater than the first maximum number of posts.

From operation 1208, the method 1200 flows to operation 1210 where the one or more processors merged the identified posts by the first query with the identified posts by the second query.

At operation 1212, the one or more processors send the merged posts to the client device for presentation of the merged posts on the user interface of the client device.

In one example, performing the first query includes selecting the first maximum number of posts within the first time horizon, ranking the selected first maximum number of posts, and selecting a predetermined number of tops posts based on the ranking.

In one example merging includes making a sorted list of posts that begins with the identified posts by the first query followed by other posts identified by the second query.

In one example, merging includes making a sorted list of posts that begins with the identified posts by the first query followed by other posts identified by the second query.

In one example, the first query and the second query are performed in parallel.

In one example, the method 1200 further comprises training a machine learning model to predict a probability that a user will access the user feed within a predetermined amount of time, and performing the second query to save results in a cache based on the probability.

In one example, the method 1200 further comprises saving results from the second query in a cache, receiving a new request to access the user feed, and sending the results saved in the cache.

In one example, the method 1200 further comprises capturing results from a plurality of first queries and a plurality of corresponding second queries, comparing results from the plurality of first queries and the plurality of second queries, and tuning search parameters based on the comparison.

In one example, the user feed includes critical posts and non-critical posts, the critical posts being the posts identified by the first query and the non-critical posts being additional posts identified by the second query.

In one example, the method 1200 further comprises saving results of second query in a cache.

Another general aspect is for a system that includes a memory comprising instructions and one or more computer processors. The instructions, when executed by the one or more computer processors, cause the one or more computer processors to perform operations comprising: receiving from a client device a request to access a user feed containing one or more posts; performing a first query to search posts for the user feed, the first query using a first time horizon delimiting a creation time of posts and a first maximum number of posts selected for ranking; sending identified posts by the first query to the client device for presentation on a user interface of the client device; performing a second query to search posts for the user feed, the second query using a second time horizon that is greater than the first time horizon, the second query using a second maximum number of posts for ranking that is greater than the first maximum number of posts; merging identified posts by the first query with identified posts by the second query; and sending the merged posts to the client device for presentation of the merged posts on the user interface of the client device.

In yet another general aspect, a machine-readable storage medium (e.g., a non-transitory storage medium) includes instructions that, when executed by a machine, cause the machine to perform operations comprising: receiving from a client device a request to access a user feed containing one or more posts; performing a first query to search posts for the user feed, the first query using a first time horizon delimiting a creation time of posts and a first maximum number of posts selected for ranking; sending identified posts by the first query to the client device for presentation on a user interface of the client device; performing a second query to search posts for the user feed, the second query using a second time horizon that is greater than the first time horizon, the second query using a second maximum number of posts for ranking that is greater than the first maximum number of posts; merging identified posts by the first query with identified posts by the second query; and sending the merged posts to the client device for presentation of the merged posts on the user interface of the client device.

Figure 13:
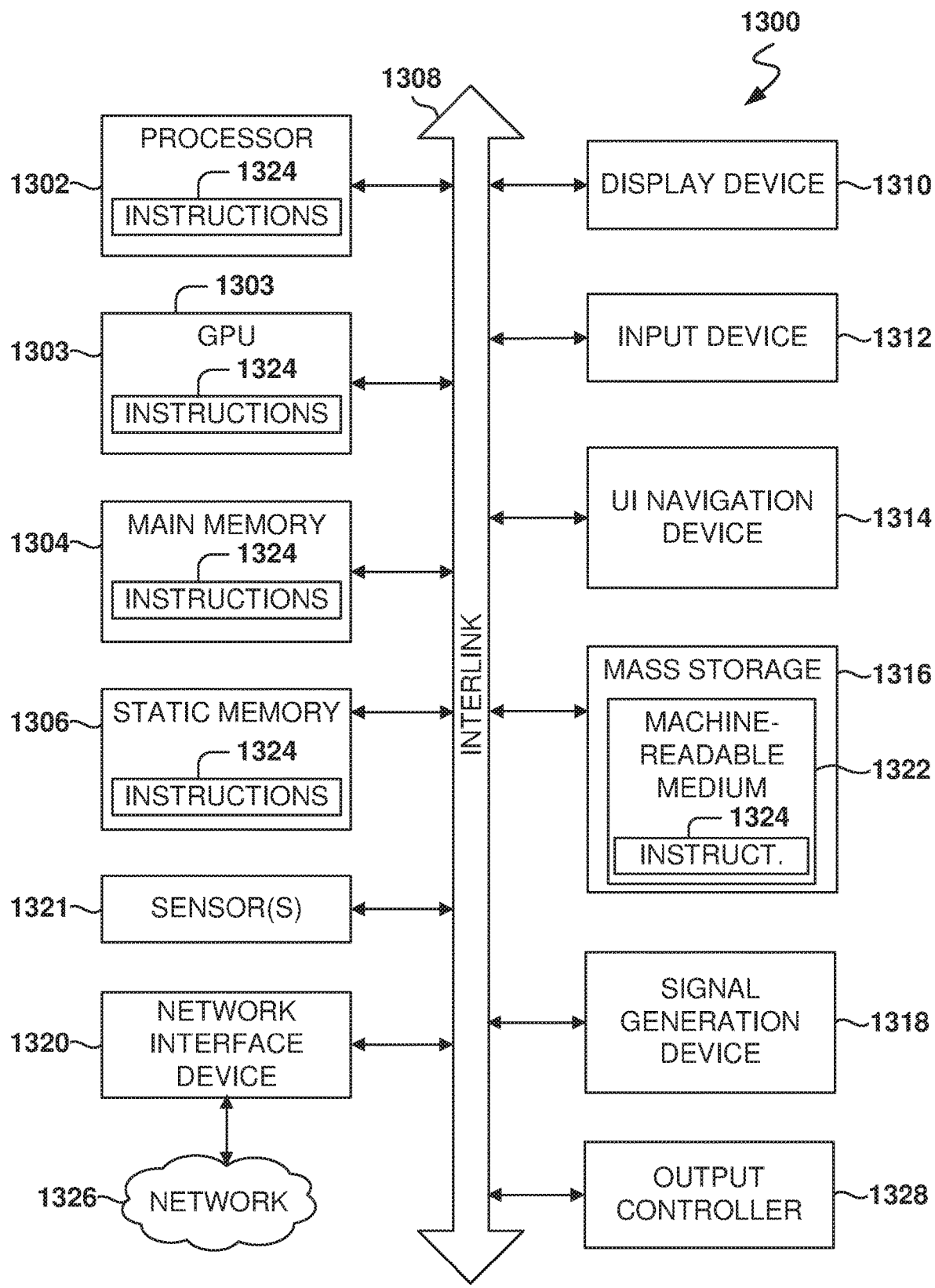
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by one or more processors, from a client device, a request for a user feed containing one or more posts;
training a machine learning model to predict a probability that a user will access the user feed within a predetermined amount of time;
performing, by the one or more processors, a first query to search posts for the user feed, the first query using a first time horizon delimiting a creation time of posts and a first maximum number of posts selected for ranking;
sending, by the one or more processors, identified posts by the first query to the client device for presentation on a user interface of the client device;
performing, by the one or more processors, a second query to search posts for the user feed and to save results in a cache based on the probability, the second query using a second time horizon that is greater than the first time horizon, the second query using a second maximum number of posts for ranking that is greater than the first maximum number of posts;

merging, by the one or more processors, identified posts by the first query with identified posts by the second query; and sending, by the one or more processors, the merged posts to the client device for presentation of the merged posts on the user interface of the client device.

2. The method as recited in claim 1, wherein performing the first query includes:

selecting the first maximum number of posts within the first time horizon;

ranking the selected first maximum number of posts; and selecting a predetermined number of tops posts based on the ranking.

3. The method as recited in claim 1, wherein merging includes:

making a sorted list of posts that begins with the identified posts by the first query followed by other posts identified by the second query.

4. The method as recited in claim 1, wherein the first query and the second query are performed in parallel.

5. The method as recited in claim 1, further comprising:

saving results from the second query in a cache;

receiving a new request to access the user feed; and sending the results saved in the cache.

6. The method as recited in claim 1, further comprising:

capturing results from a plurality of first queries and a plurality of corresponding second queries;

comparing results from the plurality of first queries and the plurality of second queries; and tuning search parameters based on the comparison.

7. The method as recited in claim 1, wherein the user feed includes critical posts and non-critical posts, the critical posts being the posts identified by the first query and the non-critical posts being additional posts identified by the second query.

8. The method as recited in claim 1, further comprising:

saving results of second query in a cache.

9. A system comprising:

a memory comprising instructions; and one or more computer processors, wherein the instructions, when executed by the one or more computer processors, cause the system to perform operations comprising:

receiving, from a client device, a request for a user feed containing one or more posts;

training a machine learning model to predict a probability that a user will access the user feed within a predetermined amount of time;

performing a first query to search posts for the user feed, the first query using a first time horizon delimiting a creation time of posts and a first maximum number of posts selected for ranking;

sending identified posts by the first query to the client device for presentation on a user interface of the client device;

performing a second query to search posts for the user feed and to save results in a cache based on the probability, the second query using a second time horizon that is greater than the first time horizon, the second query using a second maximum number of posts for ranking that is greater than the first maximum number of posts;

merging identified posts by the first query with identified posts by the second query; and sending the merged posts to the client device for presentation of the merged posts on the user interface of the client device.

10. The system as recited in claim 9, wherein performing the first query includes:

selecting the first maximum number of posts within the first time horizon;

ranking the selected first maximum number of posts; and selecting a predetermined number of tops posts based on the ranking.

11. The system as recited in claim 9, wherein merging includes:

making a sorted list of posts that begins with the identified posts by the first query followed by other posts identified by the second query.

12. A non-transitory machine-readable storage medium including instructions that, when executed by a machine, cause the machine to perform operations comprising:

receiving, from a client device, a request for a user feed containing one or more posts;

training a machine learning model to predict a probability that a user will access the user feed within a predetermined amount of time;

performing a first query to search posts for the user feed, the first query using a first time horizon delimiting a creation time of posts and a first maximum number of posts selected for ranking;

sending identified posts by the first query to the client device for presentation on a user interface of the client device;

performing a second query to search posts for the user feed and to save results in a cache based on the probability, the second query using a second time horizon that is greater than the first time horizon, the second query using a second maximum number of posts for ranking that is greater than the first maximum number of posts;

merging identified posts by the first query with identified posts by the second query; and sending the merged posts to the client device for presentation of the merged posts on the user interface of the client device.

13. The non-transitory machine-readable storage medium as recited in claim 12, wherein performing the first query includes:

selecting the first maximum number of posts within the first time horizon;

ranking the selected first maximum number of posts; and selecting a predetermined number of tops posts based on the ranking.

14. The non-transitory machine-readable storage medium as recited in claim 12, wherein merging includes:

making a sorted list of posts that begins with the identified posts by the first query followed by other posts identified by the second query.

* * * * *